(12) United States Patent
Sugiura

(10) Patent No.: US 6,457,136 B1
(45) Date of Patent: Sep. 24, 2002

(54) POWER MANAGEMENT METHOD DETECTING INTERRUPTION OF AC POWER IN SUSPENDED STATE OF COMPUTER SYSTEM

(75) Inventor: Atsuko Sugiura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/340,435

(22) Filed: Jun. 28, 1999

(30) Foreign Application Priority Data

Jun. 29, 1998 (JP) .......................................... 10-183067

(51) Int. Cl.$^7$ ................................................ G06F 1/30
(52) U.S. Cl. .............................. 713/340; 714/22; 714/24
(58) Field of Search ................................. 713/320, 322, 713/323, 324, 340; 714/22, 24

(56) References Cited

U.S. PATENT DOCUMENTS 5,944,828 A    8/1999   Matsuoka

FOREIGN PATENT DOCUMENTS

| JP | 6-124148  | 5/1994  |
| JP | 6-138987  | 5/1994  |
| JP | 6-314134  | 11/1994 |
| JP | 8-305469  | 11/1996 |
| JP | 9-167029  | 6/1997  |
| JP | 9-237128  | 9/1997  |
| JP | 10-97353  | 4/1998  |
| JP | 10-091296 | 4/1998  |

*Primary Examiner*—Glenn A. Auve
(74) *Attorney, Agent, or Firm*—Foley & Lardner

(57) ABSTRACT

A power management method for a computer system is provided, which is not affected by a problem with the power and needs a shorter time for the computer system to resume from the suspended state. In the method, when the computer system resumes from the suspended state, if a power controller for controlling the power has not been initialized, it is determined that no interruption of the AC power occurred, and the computer system resumes the previous state based on the data stored in the main memory, while if the power controller has been initialized, it is determined that an interruption of the AC power occurred, and the data stored on the hard disk is read out and the computer system resumes the previous state based on the readout data.

4 Claims, 2 Drawing Sheets

POWER MANAGEMENT METHOD DETECTING INTERRUPTION OF AC POWER IN SUSPENDED STATE OF COMPUTER SYSTEM

BACKGROUND OF THE INVENTION

1. Field of the Invention

The present invention relates to a power management method for a computer system.

This application is based on Patent Application No. Hei 10-183067 filed in Japan, the contents of which are incorporated herein by reference.

2. Description of the Related Art

When a computer system is suspended for power management, the current states of the computer system may be maintained by continuously providing electricity to a memory (i.e., in a "suspend-to-memory" method), or all the states of the computer system are stored on a hard disk (i.e., in a "suspend-to-disk" method). In the "suspend-to-memory" method, the time necessary for the computer system to resume is shorter in comparison with the "suspend-to-disk" method. However, the information saved in the memory may be lost due to a short break (or interruption) in the power, and if the information is lost, the computer system cannot resume, that is, cannot be return to the previous state. In contrast, the "suspend-to-disk" method is not affected by a problem with the power, but needs a much longer time for resuming.

SUMMARY OF THE INVENTION

In consideration of the above problems, an objective of the present invention is to provide a power management method for a computer system, which is not affected by problems with the power and needs a shorter time for the computer system to resume from the suspended state.

Therefore, the present invention provides a power management method used in a computer system, in which data stored in a main memory is stored on a hard disk when the computer system enters a suspended state, wherein:

when the computer system resumes from the suspended state:

(i) if a power controller for controlling the power of the computer system has not been initialized after the computer system entered the suspended state, it is determined that no interruption of the AC power of the computer system occurred, and the computer system is made to resume the previous state before the suspension, based on the data stored in the main memory; and (ii) if the power controller has been initialized, it is determined that an interruption of the AC power of the computer system occurred after the computer system entered the suspended state, and the data stored on the hard disk is read out and the computer system is made to resume the previous state before the suspension based on the readout data.

In the above method, when the computer system enters the suspended state, information indicating that the computer system is entering the suspended state is stored in a battery-backup memory; and it is determined that the computer system is resuming from the suspended state, based on the information stored in the battery-backup memory.

According to the present invention, if no problem with the AC power has occurred, the computer system can resume within a time as long as that necessary in the conventional "suspend-to-memory" method, and even if data stored in the main memory is lost due to a problem with the AC power, the computer system can stably resume.

DESCRIPTION OF THE PREFERRED EMBODIMENTS

Hereinafter, an embodiment of the power management method according to the present invention will be explained with reference to the drawings.

Figure 1:
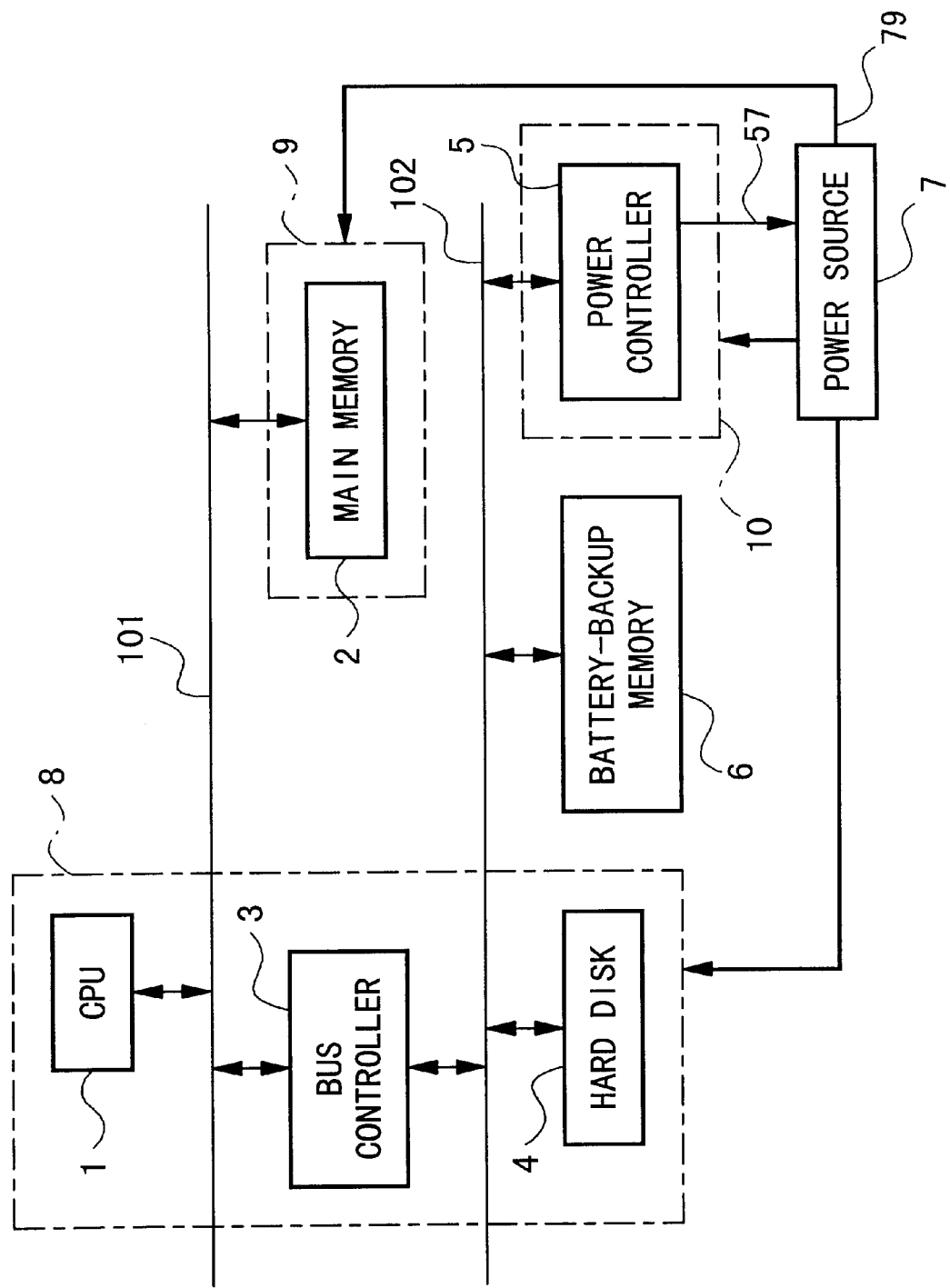
FIG. 1 is a block diagram explaining the functional structure of an embodiment according to the present invention.

FIG. 1 is a block diagram explaining a functional structure relating to the present embodiment. In this figure, reference numeral 1 indicates a CPU (central processing unit), reference numeral 2 indicates a main memory, reference numeral 3 indicates a bus controller, reference numeral 4 indicates a hard disk, reference numeral 5 indicates a power controller, reference numeral 6 indicates a battery-backup memory, and reference numeral 7 indicates a power source. The CPU 1, bus controller 3, and hard disk 4 exist in a Vcc power plane 8 to which power is supplied via a Vcc power supply line 78 from the power source 7. Power is continuously supplied to the Vcc power supply line 78 while the relevant computer system normally operates.

The main memory 2 exists in a suspension power plane 9 to which power is supplied via a suspension power supply line 79 from the power source 7. Power is supplied to the suspension power supply line 79 while the relevant computer system normally operates and also while the computer system is in a suspended state. That is, even if the Vcc power supply line 78 is disconnected in the suspended state of the computer system, necessary power supply can be continued.

The CPU 1, connected via CPU bus 101 with main memory 2 and bus controller 3, accesses (via the bus controller 3) power controller 5, battery-backup memory 6, and hard disk 4, which are connected to I/O bus 102. The power controller 5 exists in a constant power-source plane 10 to which power is continuously supplied while the main AC power of the computer system is in the ON state.

The power controller 5 receives a command from CPU 1, and controls the power source 7 by using a control signal 57 based on the received command. The power controller 5 also receives another command from CPU 1 so as to disconnect (the power in) the Vcc power plane 8. In addition, the power controller 5 confirms the presence or absence of a resumption factor (for the computer system to resume) while the computer system is in the suspended state, and if the controller detects a resumption factor, the controller controls the supplying of power to the Vcc power supply line 78. Furthermore, if the AC power is disconnected, a troubleshooting operation is performed in which, for example, the power controller 5 is initialized.

The battery-backup memory 6 can maintain the information stored therein even if the AC power is disconnected and thus power cannot be supplied to the computer system from the power source 7. Immediately after the AC power is turned ON, power is supplied from the power source 7 to the constant power-source plane 10.

Operations of the above-explained system used in the present embodiment will be explained below.

First, the operations performed when the computer system enters the suspended state due to a suspension factor (for suspending the computer system). In this case, CPU 1 stores all data stored in the main memory 2 on hard disk 4, and also stores information indicating that the computer system is entering the suspended state into the battery-backup memory 6.

The CPU 1 issues a command to power controller 5 for disconnecting the power supply to the Vcc power plane 8. The power controller 5 receives this command and disconnects the power supply to the Vcc power plane 8 so that the computer system enters the suspended state.

Figure 2:
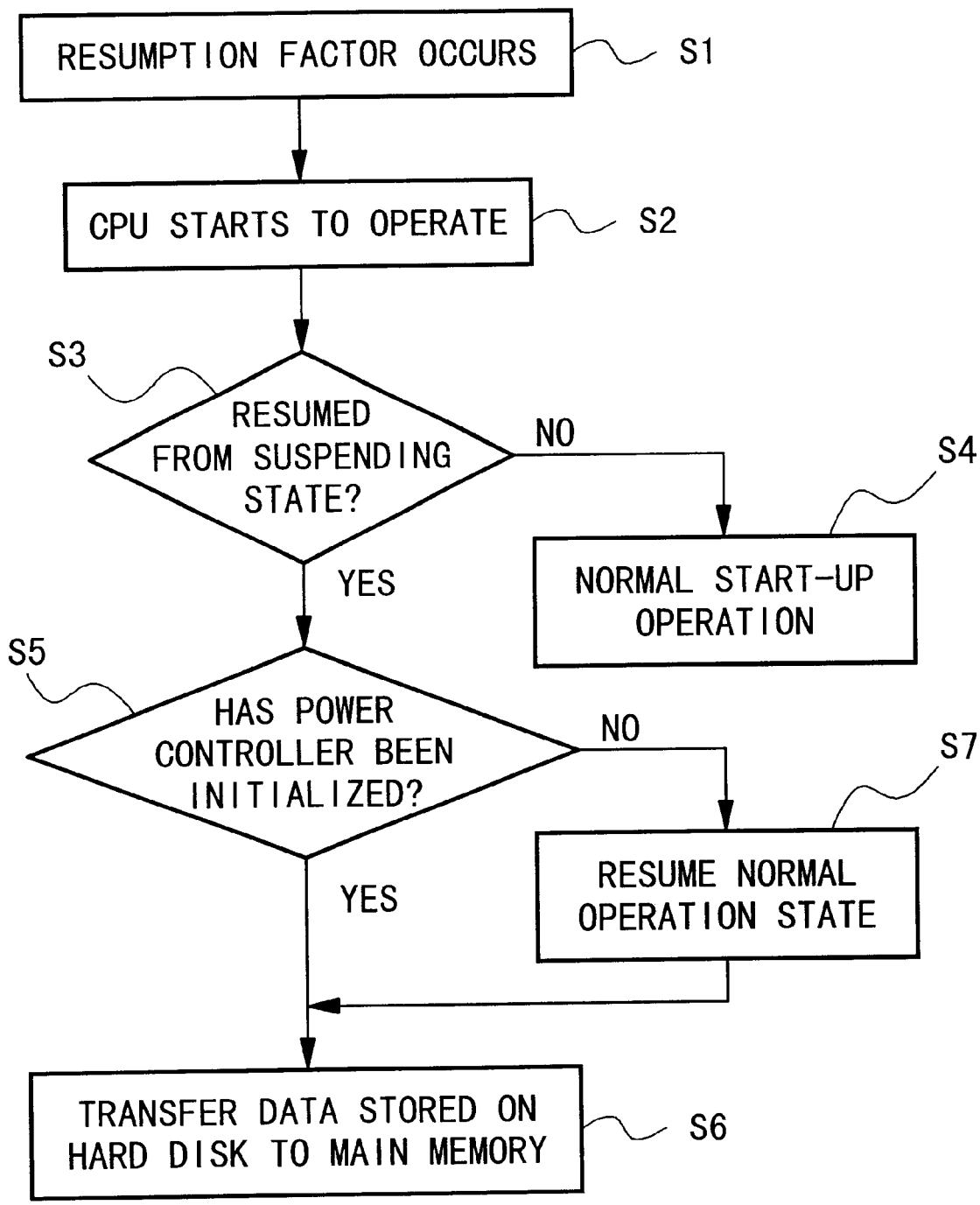
FIG. 2 is a flowchart showing the operations of the embodiment.

Next, the operations performed when a resumption factor occurs and the computer system resumes from the suspended state will be explained with reference to the flow-chart shown in FIG. 2.

When a resumption factor occurs (see step S1), the power controller 5 controls the power source 7 so that the power supply to the Vcc power plane 8 is started (see step S2). As a result, CPU 1 starts to operate, and reads out information stored in the battery-backup memory. According to the information, CPU 1 determines whether the computer system has resumed from the suspended state or restarted from the power-OFF state (see step S3).

If it is determined that the computer system has restarted from the power-OFF state, CPU 1 performs the normal start-up operation (see step S4), while if it is determined that the computer system has resumed from the suspended state, CPU 1 then determines whether the power controller 5 has been initialized. With reference to the determined result, the CPU 1 further determines whether an interruption of the AC power occurred after the computer system entered the suspended state (see step S5).

If the power controller 5 has not been initialized, CPU 1 determines that no interruption of the AC power occurred. In this case, as the data stored in the main memory 2 is not lost, CPU 1 refers to the data and makes the computer system resume the normal operation state (see step S6). That is, no readout operation of the hard disk 4 is performed in this case, and thus the computer system resumes the normal operation state in a short time.

If it is determined in the above step S5 that the power controller 5 has been initialized and thus an interruption of the AC power occurred, then as data stored in the main memory 2 is ineffective, the CPU 1 reads out the data which was stored on the hard disk 4 before the suspension and transfers the data to the main memory 2 (see step S7). The CPU 1 then makes the computer system resume the previous state (before the suspension) based on the transferred data. That is, the operation for reading out data from the hard disk 4 is necessary and thus this case takes a longer time for the computer system to resume; however, the computer system can stably resume.

What is claimed is:

1. A power management method used in a computer system, in which data stored in a main memory is stored on a hard disk when the computer system enters a suspended state, wherein:

when the computer system resumes from the suspended state, it is determined whether a power controller for controlling the power of the computer system has been initialized after the computer system entered the suspended state, and:

if it is determined that the power controller has not been initialized, then it is determined that no interruption of the AC power of the computer system occurred, and the computer system is made to resume the previous state before the suspension, based on the data stored in the main memory; and if it is determined that the power controller has been initialized, then it is determined that an interruption of the AC power of the computer system occurred after the computer system entered the suspended state, and the data stored on the hard disk is read out and the computer system is made to resume the previous state before the suspension based on the readout data.

2. A power management method as claimed in claim 1, wherein:

when the computer system enters the suspended state, information indicating that the computer system is entering the suspended state is stored in a battery-backup memory; and it is determined that the computer system is resuming from the suspended state, based on the information stored in the battery-backup memory.

3. A power management method used in a computer system, in which data stored in a main memory is stored on a hard disk when the computer system enters a suspended state, wherein:

when the computer system resumes from the suspended state:

if a power controller for controlling the power of the computer system has not been initialized since the time the computer system entered the suspended state, the computer system is made to resume the previous state before the suspension, based on the data stored in the main memory; and if the power controller has been initialized since the time the computer system entered the suspended state, the data stored on the hard disk is read out and the computer system is made to resume the previous state before the suspension based on the readout data.

4. A power management method as in claim 3, wherein:

when the computer system enters the suspended state, information indicating the computer system is entering the suspended state is stored in a battery-backup memory; and it is determined that the computer system is resuming from the suspended state, based on the information stored in the battery-backup memory.

* * * * *